(12) United States Patent
Paul et al.

(10) Patent No.: US 10,382,592 B2
(45) Date of Patent: Aug. 13, 2019

(54) SEGMENT ROUTING LABEL SWITCHED PATH FOR NON-SEGMENT ROUTING ENABLED ROUTERS

(71) Applicant: Juniper Networks, Inc., Sunnyvale, CA (US)

(72) Inventors: Arijit Paul, Cupertino, CA (US); Amit J. Upadhyay, Cupertino, CA (US); JenChieh Tsai, Millburn, NJ (US); Naga Hari Prasad V. V. Chintakunta, Banglore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 27 days.

(21) Appl. No.: 15/647,828

(22) Filed: Jul. 12, 2017

(65) Prior Publication Data

US 2019/0020738 A1    Jan. 17, 2019

(51) Int. Cl.
*H04L 29/06* (2006.01)
*H04L 12/775* (2013.01)
(Continued)

(52) U.S. Cl.
CPC ............ *H04L 69/166* (2013.01); *H04L 45/34* (2013.01); *H04L 45/58* (2013.01); *H04L 47/825* (2013.01);
(Continued)

(58) Field of Classification Search
CPC ..... H04L 69/166; H04L 45/34; H04L 47/825; H04L 45/58; H04L 45/66; H04L 45/42; H04L 45/38; H04L 41/0813; H04L 45/50
See application file for complete search history.

(56) References Cited

U.S. PATENT DOCUMENTS

2015/0256456 A1* 9/2015 Previdi ................. H04L 45/745
                                                              370/392
2016/0006614 A1* 1/2016 Zhao ....................... H04L 45/64
                                                              370/254
(Continued)

OTHER PUBLICATIONS

Shakir et al., "Performance Engineered LSPs using the Segment Routing Data-Plane", IETF. (Year: 2013).*
(Continued)

*Primary Examiner* — Peter P Chau
(74) *Attorney, Agent, or Firm* — Shumaker & Sieffert, P.A.

(57) ABSTRACT

Techniques are described for establishing a segment routed label switched path (LSP) regardless of whether a router along the shortest path is not enabled for segment routing. For example, a resource reservation LSP (e.g., a resource reservation protocol (RSVP) LSP) is established across the router that is not enabled for segment routing, such that the segment routed LSP may be established to tunnel through the resource reservation LSP. For example, when a centralized controller receives a request to establish a path using segment routing, one or more routers along the shortest path may not be enabled for segment routing. Instead of rejecting the request to establish the segment routed LSP in response to determining that one or more routers in a selected path are not enabled for segment routing, the controller may establish a resource reservation LSP to tunnel around the router that is not enabled for segment routing.

19 Claims, 6 Drawing Sheets

(51) Int. Cl.
  *H04L 12/721* (2013.01)
  *H04L 12/911* (2013.01)
  *H04L 12/24* (2006.01)
  *H04L 12/723* (2013.01)
  *H04L 12/717* (2013.01)

(52) U.S. Cl.
  CPC .......... *H04L 41/0813* (2013.01); *H04L 45/38* (2013.01); *H04L 45/42* (2013.01); *H04L 45/50* (2013.01); *H04L 45/66* (2013.01)

(56) References Cited

U.S. PATENT DOCUMENTS

| | | |
|---|---|---|
| 2016/0021000 A1 | 1/2016 | Previdi et al. |
| 2016/0173366 A1* | 6/2016 | Saad ........................ H04L 45/22 370/218 |
| 2016/0218961 A1* | 7/2016 | Lindem, III ........ H04L 12/4633 |

OTHER PUBLICATIONS

Filsfils et al., "Segment Routing interworking with LDP", IETF. (Year: 2017).*
Previdi et al., "Source Packet Routing in Networking (SPRING) Problem Statement and Requirements," RFC 7855, Internet Engineering Task Force, IETF, May 2016, 19 pp.
Filsfils et al., "Segment Routing Architecture draft-filsfils-rtgwg-segment-routing-00," Internet-Draft, Network Working Group, Jun. 28, 2013, 28 pp.
Filsfils et al., "Segment Routing Use Cases draft-filsfils-rtgwg-segment-routing-use-cases-01," Internet-Draft, Network Working Group, Jul. 14, 2013, 46 pp.
Filsfils et al., "Segment Routing Architecture draft-filsfils-spring-segment-routing-04," Internet-Draft, Network Working Group, Jul. 3, 2014, 18 pp.
Filsfils et al., "Segment Routing with MPLS data plane draft-filsfils-spring-segment-routing-mpls-03," Internet-Draft, Network Working Group, Jul. 31, 2014, 14 pp.
Awduche et al., "RSVP-TE: Extensions to RSVP for LSP Tunnels," RFC 3209, Network Working Group, Dec. 2001, 61 pp.
Vasseur et al., "Path Computation Element (PCE) Communication Protocol (PCEP)," RFC 5440, Network Working Group, Mar. 2009, 87 pp.
Enns et al., "Network Configuration Protocol (NETCONF)," RFC 6241, Internet Engineering Task Force, IETF, Jun. 2011, 113 pp.
Moy, "OSPF Version 2," RFC 2328, Network Working Group, Apr. 1998, 244 pp.
Coltun et al., "OSPF for IPv6," RFC 5340, Network Working Group, Jul. 2008, 94 pp.
Sheth et al., "OSPF Hybrid Broadcast and Point-to-Multipoint Interface Type," RFC 6845, Internet Engineering Task Force, IETF, Jan. 2013, 9 pp.
Lindem et al., "OSPFv3 LSA Extendibility draft-acee-ospfv3-lsa-extend-01.txt," Internet-Draft, Network Working Group, Jul. 15, 2013, 27 pp.
Oran, "OSI IS-IS Intra-domain Routing Protocol," RFC 1142, Network Working Group, Feb. 1990, 157 pp.
Li et al., "IGP Requirements for Traffic Engineering with MPLS draft-li-mpls-igp-te-00.txt," Internet-Draft, Network Working Group, Feb. 1999, 6 pp.
Partial European Search Report from counterpart European Application No. 18180505.2, dated Oct. 11, 2018, 12 pp.
Extended Search Report from counterpart European Application No. 18180505.2, dated Jan. 14, 2019, 11 pp.

* cited by examiner

SEGMENT ROUTING LABEL SWITCHED PATH FOR NON-SEGMENT ROUTING ENABLED ROUTERS

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may employ segment routing techniques, such as by using a Source Packet Routing in Networking (SPRING) protocol, that provides segment routing within an IGP domain to advertise single or multi-hop LSPs. SPRING includes multiple different label types including "adjacency" labels and "node" labels. To forward a packet through the network, the routers may push, pop, or swap one or more labels in a label stack, e.g., a segment list, that is applied to the packet as it is forwarded through the network.

SUMMARY

In general, techniques are described for establishing a segment routed label switched path (LSP) regardless of whether a router along the shortest path is not enabled for segment routing. For example, a resource reservation LSP (e.g., a resource reservation protocol (RSVP) LSP) is established across the router that is not enabled for segment routing, such that the segment routed LSP may be established to tunnel through the resource reservation LSP.

For example, when a centralized controller receives a request to establish a shortest path using segment routing, one or more routers along the shortest path may not be enabled for segment routing. Instead of rejecting the request to establish the segment routed LSP in response to determining that one or more routers in a shortest path are not enabled for segment routing, the controller may establish a resource reservation LSP around the router that is not enabled for segment routing. The controller may then establish an end-to-end segment routed LSP that tunnels through the resource reservation LSP. For example, the segment routed LSP may be a Source Packet Routing in Networking (SPRING) LSP in accordance with the SPRING protocol and the resource reservation LSP may be a Resource Reservation Protocol (RSVP) LSP. In this way, the controller may establish a segment routed LSP regardless of whether every router on the shortest path is enabled for segment routing.

In one example a method includes receiving, by a controller that manages a plurality of network devices in a network, a request for a segment routed Label Switched Path (LSP) that extends from an ingress network device of the plurality of network devices to an egress network device of the plurality of network devices. The method also includes determining, by the controller, that a first network device of the plurality of network devices is not enabled for segment routing. The method also includes, in response to determining that the first network device is not enabled for segment routing, establishing, by the controller, a resource reservation LSP from a second network device to a third network device, wherein the first network device is positioned in between the second network device and the third network device. The method also includes sending, by the controller and to the ingress network device, a provisioning request for the segment routed LSP.

In another example, a controller that manages a plurality of network devices in a network includes: a memory; and one or more processors operably coupled to the memory, wherein the one or more processors are configured to: receive a request for a segment routed Label Switched Path (LSP) that extends from an ingress network device of the plurality of network devices to an egress network device of the plurality of network devices; determine that a first network device of the plurality of network devices is not enabled for segment routing; in response to determining that the first network device is not enabled for segment routing, establish a resource reservation LSP from a second router to a third router, wherein the first router is positioned in between the second router and the third router; and send a provisioning request for the segment routed LSP.

In another example, a method includes determining, by a controller that manages a plurality of segment routing islands each including one or more network devices enabled for segment routing, a set of resource reservation Label Switched Paths (LSPs) that provide connectivity between the plurality of segment routing islands. The method also includes, in response to determining, by the controller, that a topology of at least one of the plurality of segment routing islands has changed, determining, by the controller and based on the topology change, whether the set of resource reservation LSPs requires updating. The method also includes, in response to determining the set of resource reservation LSPs requires updating, configuring, by the controller, an updated set of resource reservation LSPs including one or more resource reservation LSPs that provide connectivity to the plurality of segment routing islands after the topology change. The method also includes establishing, by the controller, at least one resource reservation LSP of the updated set of resource reservation LSPs such that a segment routed LSP tunnels through the at least one resource reservation LSP.

The details of one or more examples are set forth in the accompanying drawings and the description below. Other features, objects, and advantages will be apparent from the description and drawings, and from the claims.

DETAILED DESCRIPTION

Figure 1:
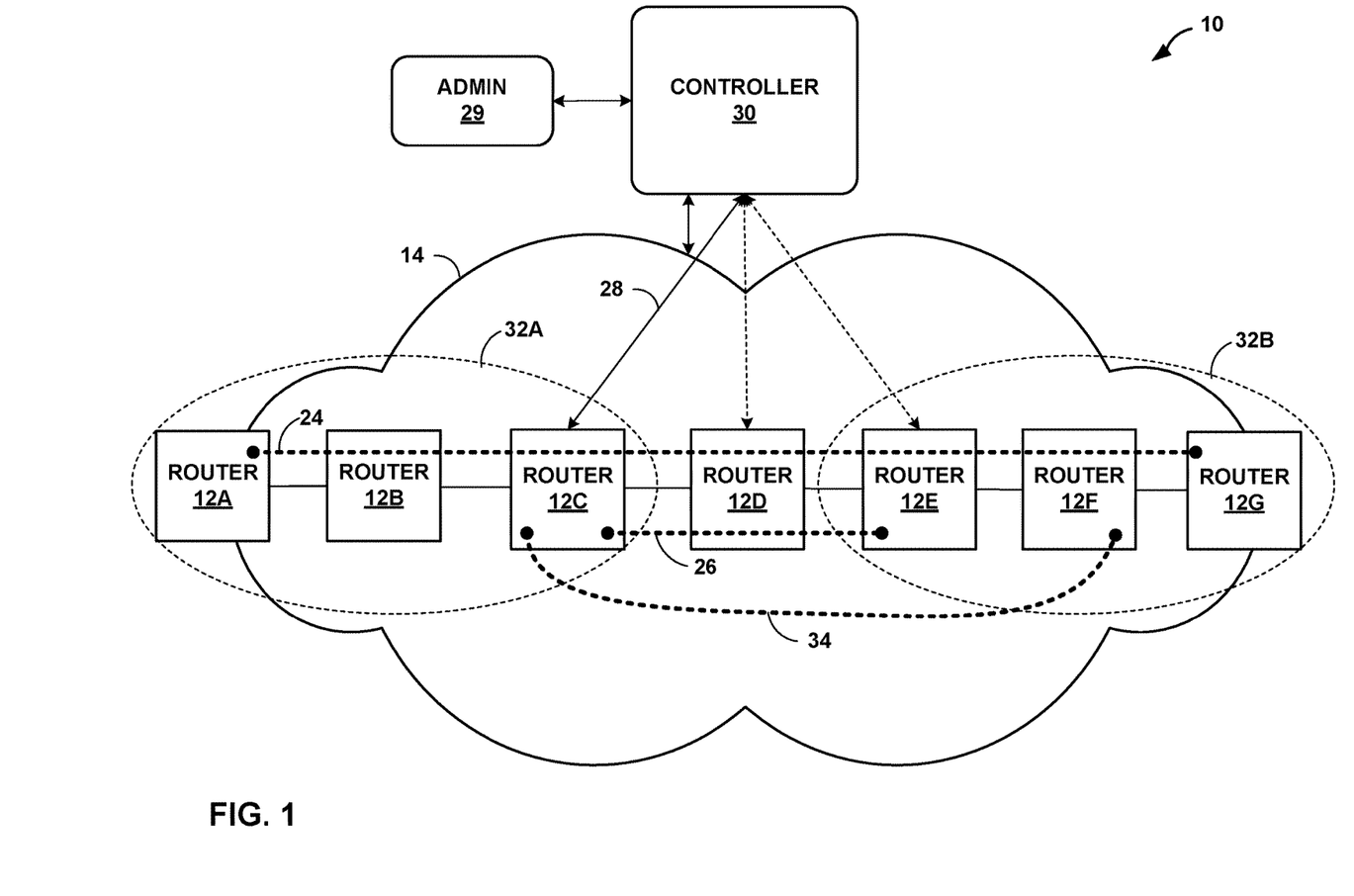
FIG. 1 is a block diagram illustrating an example system for tunneling segment routed LSP through a resource reservation LSP configured for a router that is not enabled for segment routing, in accordance with techniques described in this disclosure.

FIG. 1 is a block diagram illustrating an example system 10 that includes a computer network 14 for tunneling a segment routed Label Switched Path (LSP) through a resource reservation LSP established for a router that is not enabled for segment routing, in accordance with techniques described in this disclosure. Network 14 may include routers 12A-12G ("routers 12") to establish an LSP configured with a resource reservation protocol or segment routing protocol.

The sources of the network traffic received by ingress router 12A may comprise one or more devices (not shown) and/or any public or private network or the Internet that provides traffic to ingress router 12A in network 14. The destinations of the network traffic being forwarded on LSPs may comprise one or more destination devices and/or network that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 14.

In the example of FIG. 1, routers 12 may use segment routing techniques, e.g., Source Packet Routing in Networking (SPRING) protocol, for establishing an LSP. For example, segment routing techniques are used to configure labels for paths from ingress router 12A to egress router 12G. Segment routing within an IGP domain (e.g., network 14) allows routers to advertise single or multi-hop LSPs within the IGP domain such as a segment routing LSP. For segment routing, the "path" information is disseminated between the routers as part of the IGP link state information for the domain. Routers are able to steer packets through a controlled set of instructions, called segments, by prepending a segment routing header (e.g., label) to the packets. Segment routing allows routers to enforce a flow through any topological path and service chain while maintaining per-flow state only at the ingress node to the segment routing domain.

One potential advantage of segment routing may be that the segment routing architecture can be directly applied to the Multi-protocol Label Switching (MPLS) data plane with no change in the forwarding plane. A network administrator 29 ("ADMIN 29") need only allocate one node segment per router and the segment routing Interior Gateway Protocol (IGP) control-plane automatically builds the required MPLS forwarding constructs from a router to any other router. Segment routing is further described in Filsfils et. al., "Segment Routing Architecture," Internet-Draft draft-filsfils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013, the entire contents of each of which are incorporated herein by reference. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 201; and (3) "Segment Routing with MPLS data plane," IETF draft: draft-filsfils-spring-segment-routing-mpls-03, Aug. 1, 2014, the entire contents of each of which are incorporated by reference herein.

In the example of FIG. 1, routers 12 that are included in a segment routing domain may exchange labels in accordance with the SPRING protocol. Routers 12 operate as label switching routers (LSRs) that distribute labels to neighboring LSRs within network 10 to support SPRING forwarding along routed paths within network 10. SPRING includes multiple different label types including "adjacency" labels and "node" labels. To forward a packet through network 10, routers that are SPRING enabled may push, pop, or swap one or more labels in a label stack (e.g., a "segment list") that is applied to the packet as it is forwarded through the network. The label stack may encode the topological and service source route of the packet.

Different types of SPRING labels are further described hereinafter. An adjacency label may have a local semantic to a particular segment routing node, such as one of routers 12. In particular, an adjacency label steers traffic onto an adjacency (e.g., communication link and/or interface) or set of adjacencies. Thus, an adjacency label may be related to a particular router. To use an adjacency label, a router may initially assign the adjacency label to a particular adjacency and advertise the adjacency label to other routers in the segment routing domain using Intermediate System-Intermediate System (ISIS) protocol or the Open Shortest Path First (OSPF) protocol. The router may be the only router in the segment routing domain to use the particular adjacency label. When a router forwards a packet using the adjacency label, the router may cause the packet to use the adjacency for the router associated with the adjacency label. In this way, adjacency labels may be used to establish one-hop tunnels within network 10.

A node label, by contrast, may have a global semantic within a segment routing domain. That is, each of routers 12 that are SPRING enabled may be assigned a defined node label range (commonly referred to as Segment Routing Global Block (SRGB)) that is unique to each respective router within the segment routing domain. An operator of network 10 may ensure unique allocation of the different node label ranges from a global range to different routers. In addition to a node label range, each particular router may also have a specific node identifier that uniquely identifies the particular router in the segment routing domain. Each respective router may advertise its respective node identifier and node label range to other routers in the segment routing domain using ISIS or OSPF.

Based on routes determined using, e.g., shortest path routing, each of routers 12 may configure its forwarding state to push, pop, or swap node labels (corresponding to other nodes in the network) onto packets to forward such packets using the determined route to the destination. For instance, each of routers 12 may perform path selection using topology information learned by way of IGP to compute a shortest path within network 10 on a hop-by-hop basis based on the routing information maintained by the routers. Each of routers 12 may then select a next hop along the locally computed shortest path and install forwarding information associated with the selected next hop in a forwarding plane of the router, wherein the forwarding information identifies a network interface to be used when forwarding traffic and one or more labels to be applied when forwarding the traffic out the interface. The routers use the next hops with the assigned labels to forward traffic hop-by-hop.

To illustrate the use of node labels, egress router 12G may typically advertise its node segment identifier (node SID) to each of routers 12. Each of routers 12A-12F may typically install the node SID in its forwarding state. Router 12A may inject a packet into network 10 that is destined for router 12G with the node SID for router 12G Router 12A determines, based on a node label associated with the node SID for router 12G, that a shortest path to router 12G includes router 12B as the next-hop. Router 12A may apply a node label that indicates the node identifier for router 12G, and the node label may be within a label range assigned to 12B. In some examples, the node label is encoded to indicate both the node identifier and that the label is within a particular label range. Upon receiving the packet, router 12B may determine, based on the node label and stored forwarding information, a forwarding action. As an example, router 12B may determine that the forwarding information indicates a forwarding action of swapping the node label, which was previously applied by router 12A, for a label that indicates the node identifier for router 12G, and the new label may be within a label range assigned to 12C. In some examples, forwarding action indicates the node label is swapped for an identical node label. The packet is processed and forwarded in a similar manner by each of routers 12 on the path from router 12A to router 12G When router 12G receives the packet, router 12G may pop the node label from the packet and forward the packet to the destination. In this way, any router in the segment routing domain may forward a packet to any other router in the network by applying the appropriate node label.

In the example of FIG. 1, system 10 includes a controller 30, which may centrally compute the SPRING LSP. Controller 30 may receive a request from a network administrator 29 (or an automated request sent to central controller 30) to configure an end-to-end SPRING LSP from router 12A to router 12G Controller 30 may compute the shortest path from ingress router 12A to egress router 12G and send a provisioning request to ingress router 12A for creating the SPRING LSP. However, in some examples, one or more of routers 12 in the shortest path may not be configured to support SPRING For illustration purposes, assume router 12D in FIG. 1 is not SPRING enabled. In this example, in response to determining that router 12D is not spring enabled, controller 30 may reject the request to create the SPRING LSP.

For example, controller 30 may determine from a link state database (LSDB) of one or more routers 12 whether one or more of routers 12 are not SPRING enabled. Routers 12, using a link-state routing protocol within a routing domain (e.g., an IGP routing domain), typically maintain a traffic engineering database (TED), such as a LSDB, for storing link-state information about nodes, links and paths within a given area referred to as the routing domain. Attributes stored in these traffic engineering databases for an IGP domain typically include, but are not limited to, ingress/egress IP addresses for the path, a list of explicit route objects (EROs), a backup ERO list, a list of supported hop-by-hop algorithms, and hop-by-hop label ranges. In some examples, routers that support SPRING also store in the TED segment identifier (SID) information, including node segment identifiers (Node SIDs) or adjacency segment identifiers (adjacency SIDs). Examples of SIDs include an MPLS label, an index value in an MPLS label space, and an Internet Protocol (IP) address of the node. Controller 30 may peer into the LSDB of routers 12 using IGP or border gateway protocol link state (BGP-LS) to determine that the LSDB of router 12D does not include SID, and as such, is not SPRING enabled. In some examples, controller 30 may import the information in the LSDB of routers 12 into the TED of controller 30. In any event, controller 30 may determine the non-existence of SID information of any of routers 12 to determine whether one or more routers in the shortest path are not SPRING enabled in which controller 30 would typically reject the request to establish the SPRING LSP.

In accordance with the techniques described herein, rather than rejecting a request to establish an end-to-end SPRING LSP from ingress router 12A to egress router 12G when router 12D along the shortest path is not SPRING enabled, controller 30 may establish an RSVP LSP 26 to tunnel across the non-SPRING-enabled router 12D from router 12C to router 12E. An end-to-end SPRING LSP 24 from ingress router 12A to egress router 12G may then be established and tunnel through RSVP LSP 26.

Controller 30 may configure RSVP LSP 26 between routers adjacent to the router that is not SPRING enabled such that a SPRING LSP 24 may tunnel through RSVP LSP 26. To establish RSVP LSP 26 between routers 12C and 12E, controller 30 may use a path computation element protocol (PCEP) or Network Configuration (NETCONF) protocol to establish a configuration session. In the example of FIG. 1, controller 30 may use PCEP to establish a PCEP configuration session 28 with router 12C to configure router 12C to establish an RSVP LSP between routers 12C and 12E. For example, controller 30 may provide router 12C with an explicit route object (ERO) defining the path for the RSVP LSP, e.g., the path through routers 12C, 12D, 12E. In response to receiving the ERO from controller 30, router 12C establishes RSVP LSP 26 by sending signaling messages that request reservation of a specified amount of bandwidth for the LSPs. In some examples, network administrator 29 may use PCEP to establish a respective PCEP configuration session with each router of RSVP LSP 26, e.g., routers 12C, 12D, and 12E. For illustrative purposes, at least routers 12C-12E may use a resource reservation protocol such as the Resource Reservation Protocol with Traffic Engineering extensions (RSVP-TE) to establish RSVP LSP 26.

To enable SPRING LSP 24 to be tunneled through RSVP LSP 26, a network administrator 29, via controller 30, may configure a tunneling command (as further described below) for routers 12C-12E. For example, network administrator 29 may, via controller 30, configure protocol shortcuts, e.g., ISIS and Traffic-Engineering, and the internet protocol (IP) family ("family inet"), such as IPv4 routes, to enable an end-to-end SPRING LSP to tunnel through the established RSVP LSP.

In some examples, rather than controller 30 computing the path and providing it to router 12C, controller 30 may trigger router 12C to use the RSVP-TE protocol to compute a path from router 12C to router 12E that satisfies certain constraints on RSVP LSP 26 imposed by the network administrator. For example, routers 12C-12E may establish RSVP-TE LSP based on constraint information about links within network 14 including, for example, reserved bandwidth availability, link color, Shared Risk Link Group (SRLG), and the like. RSVP-TE may use reserved bandwidth availability information accumulated by route advertisements from ISIS protocol or the OSPF protocol to configure RSVP LSP 26. After computing RSVP LSP 26, RSVP-TE may send a Path message for establishing RSVP LSP 26. RSVP-TE establishes LSPs that follow a single path from router 12C to router 12E, and all network traffic sent on RSVP LSP 26 must follow exactly that path. Further examples of RSVP-TE are described in D. Awduche et. al, "RSVP-TE: Extensions to RSVP for LSP Tunnels," Request for Comments 3209, December 2001, the entire contents being incorporated by reference herein.

In some examples, controller 30 may optimize a set of resource reservation LSPs connecting segment routing islands 32A, 32B (collectively, "segment routing islands 32"). Each of segment routing islands 32 may include one or more neighboring routers that are each enabled for segment routing. Routers in a segment routing island are defined as routers for which any router in a given segment routing island can reach any other router in the segment routing island without traversing a router that is not enabled for segment routing. Routers outside the segment routing island are either not enabled for segment routing, or must traverse an intermediate hop router that is not enabled for segment routing to reach a router within the segment routing island.

For example, segment routing island 32A includes routers 12A-12C and segment routing island 32B includes routers 12E-12G. In this example, a resource reservation LSP, e.g., RSVP LSP 34, is also configured from router 12C to router 12F. In this example, each of segment routing islands 32 is connected via a set of resource reservation LSPs, e.g., RSVP LSP 26 and RSVP LSP 34. Although illustrated for purposes of example as having two segment routing islands 32 and two RSVP LSPs 26, 34 connecting the segment routing islands 32, in other examples network 10 may include more segment routing islands and multiple sets of LSPs (not necessarily RSVP) that connect the various segment routing islands. Segment routing islands may be connected by one or more LSPs, and these LSPs may be considered a "set" of LSPs that connect the segment routing islands.

In some examples, controller 30 stores state indicating membership in segment routing islands and sets of LSPs connecting segment routing islands. Controller 30 may adjust the set of resource reservation LSPs in response to determining that topologies of segment routing islands 32 have changed. For example, router 12E of segment routing island 32B may no longer be SPRING enabled. The topology of segment routing island 32B is changed to include routers 12D and 12E. In this instance, RSVP LSP 26 may no longer connect segment routing islands 32A and 32B. In response, controller 30 may remove RSVP LSP 26 from the set of RSVP LSPs that may provide connectivity between segment routing islands 32. In other examples, controller 30 may add an RSVP LSP as needed to provide connectivity between segment routing islands in response to detecting a topology change impacting the segment routing island connections. In this way, controller 30 may adjust the set of RSVP LSPs as the topology of each of segment routing islands 32 change.

In this way, a controller may not reject a request to configure an end-to-end segment routed LSP in response to determining that one or more routers are not enabled for segment routing. That is, the controller may configure the segment routed LSP regardless of whether one or more routers in the path are not enabled for segment routing. Moreover, the controller may provide global optimization or management of a set of resource reservation LSPs connecting segment routing islands.

Figure 2:
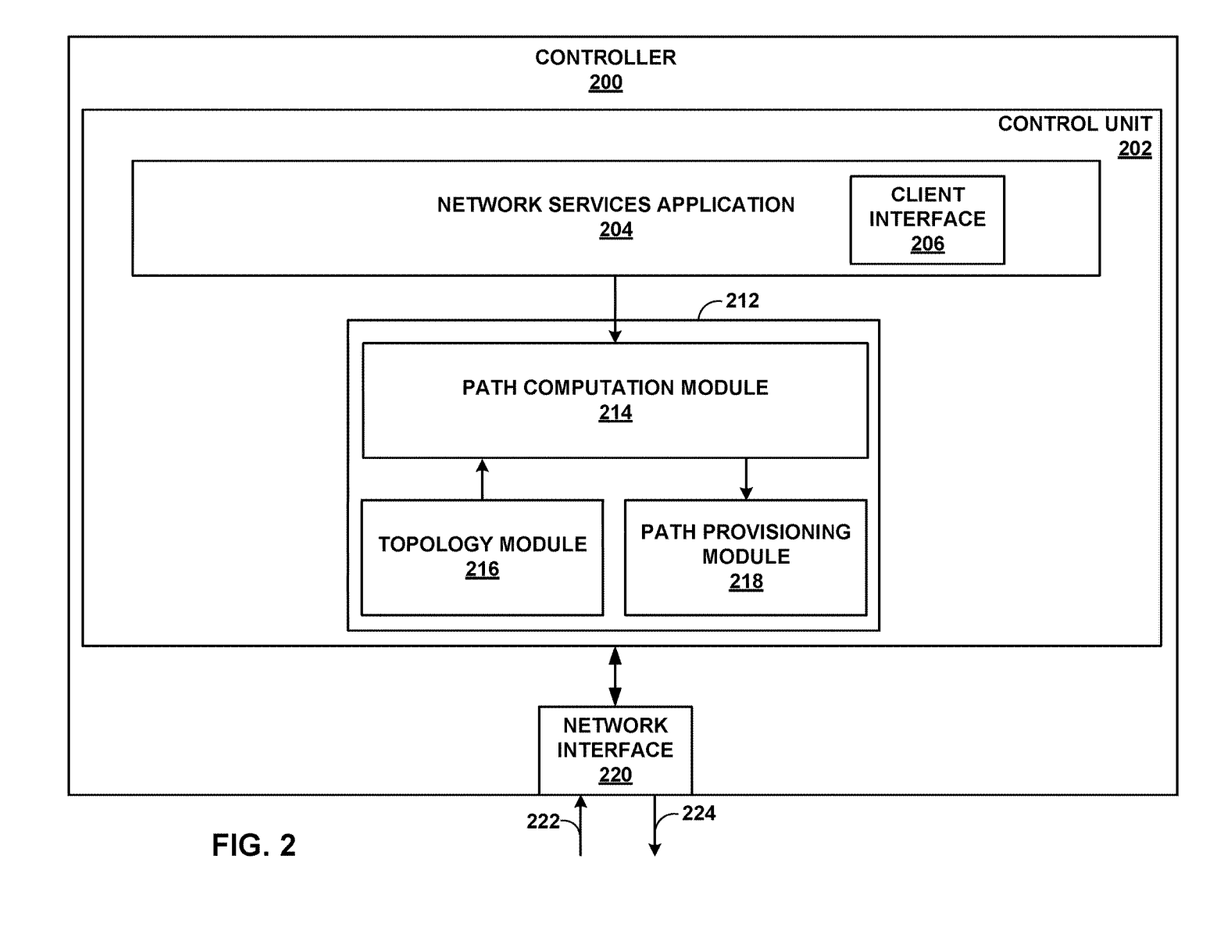
FIG. 2 is a block diagram illustrating an example controller capable of operating in accordance with the techniques described herein.

FIG. 2 is a block diagram illustrating an example of a controller capable of operating in accordance with the techniques described in this disclosure. Controller 200 may include a server or network controller, for example, and may represent an example instance of controller 30 of FIG. 1.

In the example of FIG. 2, controller 200 includes a control unit 202 coupled to a network interface 220 to exchange packets with other network devices by inbound link 222 and outbound link 224. Control unit 202 may include one or more processors (not shown in FIG. 2) that execute software instructions, such as those used to define a software or computer program, stored to a computer-readable storage medium (not shown in FIG. 2), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively, or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204 and path computation element 212. In one example, these modules may be implemented as one or more processes executing on one or more virtual machines of one or more servers. That is, while generally illustrated and described as executing on a single controller 200, aspects of these modules may be delegated to other computing devices.

Network services applications 204 represent one or more processes that provide services to clients of a service provider network that includes controller 200 to manage connectivity in the aggregation domain (alternatively referred to as the "path computation domain") according to techniques of this disclosure. Network services applications 204 may provide, for instance, Voice-over-IP (VoIP), Video-on-Demand (VOD), bulk transport, walled/open garden, IP Mobility Subsystem (IMS) and other mobility services, and Internet services to clients of the service provider network. Networks services applications 204 require services provided by path computation element 212, such as node management, session management, and policy enforcement. Each of network services applications 204 may include client interface 206 by which one or more client applications request services. Client interface 206 may represent a command line interface (CLI) or graphical user interface (GUI), for instance. Client interface 206 may also, or alternatively, provide an application programming interface (API) such as a web service to client applications.

Network services applications 204 issue path requests to path computation element 212 to request paths in a path computation domain controlled by controller 200. In one example, controller 200 may receive a customer's request for an end-to-end segment routed LSP service provided by network services applications 204.

Path computation element 212 accepts path requests from network services applications 204 to establish paths between the endpoints over the path computation domain. To compute and establish paths through the path computation domain, path computation element 212 includes topology module 216 to receive topology information describing available resources of the path computation domain, including segment identifier information.

Path computation module 214 of path computation element 212 computes requested paths through the path computation domain. For example, path computation module 214 may compute a segment routed LSP from router 12A to router 12G Provisioning the segment routed LSP may require path validation prior to committing the path to provide for packet transport. As described further below, path computation module 214 may determine that a computed segment routed LSP is not valid. That is, path computation module 214 may determine that one or more routers in the computed segment routed LSP do not include segment identifier (SID) information and are not enabled for segment routing. In response to determining that one or more routers in the computed segment routed LSP are not enabled for segment routing, path provisioning module 218 may provision a resource reservation LSP such that the computed segment routed LSP may tunnel through the resource reservation LSP.

Figure 3:
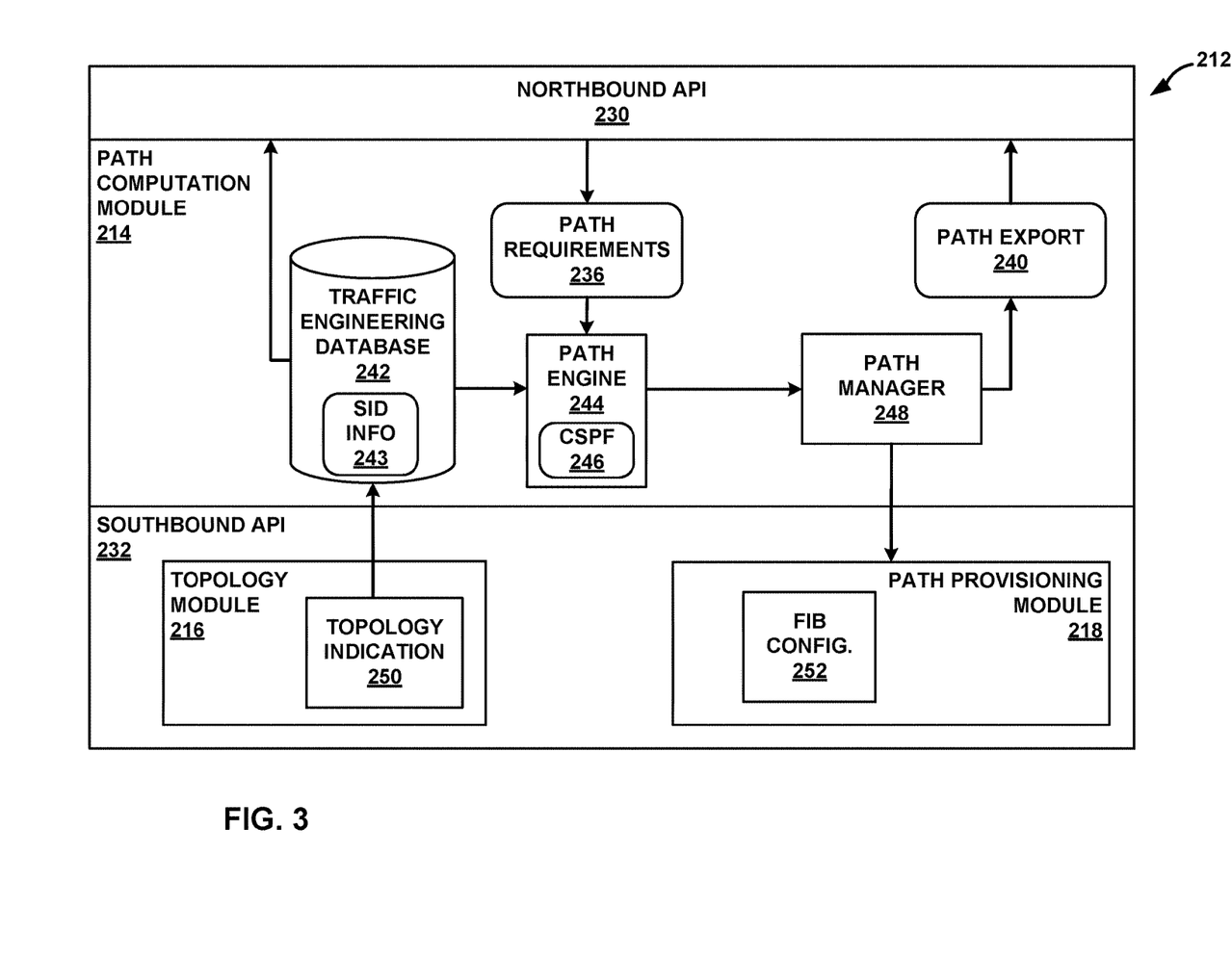
FIG. 3 is a block diagram illustrating an example implementation of a path computation element of a controller, in accordance with the techniques described in this disclosure.

FIG. 3 is a block diagram illustrating an example implementation of path computation element 212 of controller 200 of FIG. 2 in further detail. In this example, path computation element 212 includes northbound and southbound interfaces in the form of northbound application programming interface (API) 230 and southbound API 232. Northbound API 230 includes methods and/or accessible data structures by which network services applications 204 may configure and request path computation within the path computation domain. Southbound API 232 includes methods and/or accessible data structures by which path computation element 212 receives topology information for the path computation domain and establishes paths by accessing and programming data planes of routers, e.g., routers 12, within the path computation domain.

Path computation module 214 includes data structures to store path information for computing and establishing requested paths. These data structures include path requirements 236 and path export 240. Although FIG. 3 is illustrated with only path requirements 236 and path export 240 data structures, path computation module 214 may include additional data structures not shown, such as a constraints data structure that describes external constraints (e.g., bandwidth) upon path computation such that network services applications 204 can modify link attributes before path computation module 214 computes a set of paths, and an operational configuration data structure that provides configuration information to path computation element 214 to configure the path computation algorithm with respect to, for example, class of service (CoS) descriptors and detour behaviors.

Network services applications 204 may invoke northbound API 230 to install/query data from these data structures. For example, network services applications 204 may request a segment routed LSP. Path requirements 236 represent an interface that receives path requests for paths to be computed by path computation module 214 and provides these path requests (including path requirements) to path engine 244 for computation. Path requirements 236 may be received, or may be handled by path computation element 212. In such instances, a path requirement message may include a path descriptor having an ingress router identifier and egress router identifier for the routers terminating the specified path.

Path export 240 represents an interface that stores path descriptors for all paths currently committed or established in the path computation domain. In response to queries received via northbound API 230, path export 240 returns one or more path descriptors. Queries received may request paths between any two routers of the path(s). In some examples, path descriptors may be used by network services applications 204 to set up forwarding configuration at the ingress and egress routers of the path(s). A path descriptor may include an Explicit Route Object (ERO). A path descriptor or "path information" may be sent, responsive to a query from an interested party. A path export message delivers path information. In response to receiving the path descriptor, the receiving device may use a segment routing protocol, e.g., SPRING; or a resource reservation protocol, e.g., RSVP, to signal an MPLS LSP. For example, in response to receiving the path descriptor, router 12C may use RSVP to signal an RSVP LSP and router 12A may use SPRING to signal a segment routed LSP.

Topology module 216 includes topology indication module 250 to handle topology discovery and to determine whether one or more routers is not enabled for segment routing. Topology indication module 250 may include an interface to describe received topologies to path computation module 214. Topology indication module 250 may use a topology discovery protocol to describe the path computation domain topology to path computation module 214.

Topology indication module 250 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages.

In some examples, topology indication module 250 receives topology information that includes segment identifier (SID) information from routers 12. Topology indication module 250 may, for example, execute ISIS or BGP-LS to receive attributes of routers 12 that are connected to controller 200, including SID information, such as node SIDs or adjacency SIDs.

Traffic engineering database (TED) 242 may store SID information 243, received by topology indication module 250, for a network that constitutes a path computation domain for controller 200. For example, TED 242 may store to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 250. In some examples, controller 200 may use ISIS or BGP-LS to peer into LSDBs stored in routers 12 to determine the existence of SID information 243 rather than importing the SID information 243 into TED 242. In some examples, controller 200 may store SID information 243 separate from TED 242.

In general, to compute a segment routed LSP, path engine 244 determines, based on TED 242, whether there exists a path in the layer for the requested path. Path engine 244 may use the Dijkstra constrained SPF (CSPF) 246 path computation algorithms for identifying satisfactory paths though the path computation domain. In some examples, path engine 244 receives the current topology snapshot of the path computation domain in the form of TED 242 and determines, using SID information 243 in TED 242, whether the routers of the shortest path are enabled for segment routing. For example, path engine 244 may determine whether the routers of the shortest path are enabled for segment routing by determining whether SID information 243 includes SID information for each of the routers in the shortest path.

In some examples, controller 200 (e.g., PCE 212 of controller 200) may identify "islands" of routers enabled for segment routing, e.g., based on TED 242 and SID information 243. PCE 212 may provide global optimization or management a set of resource reservation LSPs connecting segment routing islands, such as in response to determining changes to segment routing island topologies.

In some examples, path engine 244 may determine, based on TED 242 and SID information 244, that SID information 243 does not include SID information associated with one or more routers of the shortest path for the requested segment routed LSP and the one or more routers are thus not enabled for segment routing. Rather than rejecting the path request because one or more routers are not enabled for segment routing, in response to determining that the one or more routers are not enabled for segment routing, path engine 244 may compute a path for a resource reservation LSP, e.g., RSVP LSP, across the one or more routers that are not enabled for segment routing and/or its adjacent routers.

Path manager 248 establishes the resource reservation LSP(s) along the computed path(s) using path provisioning module 218. In the example of FIG. 3, path provisioning module 218 includes a forwarding information base (FIB) configuration module 252 (illustrated as "FIB CONFIG 252"). FIB configuration module 252 programs forwarding information to data planes of routers of the path computation domain. FIB configuration module 252 may implement, for instance, a software-defined networking (SDN) protocol such as path computation element protocol (PCEP) to provide and direct the nodes to install forwarding information to their respective data planes. FIB configuration module 252 may in addition, or alternatively, implement other interface types, such as a Network Configuration (NETCONF) interface or any other node configuration interface. Additional details regarding PCEP may be found in "Path Computation Element (PCE) Communication Protocol (PCEP)," Network Working Group, Request for Comment 5440, March 2009, the entire contents of which is incorporated by reference herein. Additional details regarding NETCONF may be found in "Network Configuration Protocol (NETCONF)," Request for Comments 6241, June 2011, the entire contents of which is incorporated by reference herein.

FIB configuration module 252 establishes communication sessions with routers 12 to install forwarding information in accordance with information received from path computation module 214. For example, a FIB 252 may use PCEP to establish a PCEP configuration session with router 12C to provide router 12C with an explicit route object (ERO) defining the path for the resource reservation LSP between routers 12C and 12E. In this way, router 12C may use the ERO and resource reservation protocol, e.g., RSVP signaling, to establish the resource reservation LSP for the one or more routers that are not enabled for segment routing. In some examples, FIB configuration 252 may use PCEP to establish a PCEP configuration session with each router of a resource reservation LSP, e.g., routers 12C, 12D, and 12E. In any event, path provisioning module 218 may provision a resource reservation LSP from routers 12C-12E. FIB 252 may then use PCEP to establish a PCEP configuration session with router 12A to provide router 12A with an ERO defining a path for the segment routed LSP between routers 12A and 12G.

To enable tunneling support on routers configured for the resource reservation LSP, a network administrator may configure, via controller 200, the following tunneling command, to enable a segment routed LSP to be tunneled through a resource reservation LSP in routers that are needed for the resource reservation LSP (e.g., routers 12C-12E in FIG. 1):

```
protocols {
  isis {
    traffic-engineering {
      family inet {
        shortcuts;
}}}}
```

In the above example configuration, the network administrator may, via controller 200, configure protocol shortcuts, e.g., ISIS and Traffic-Engineering, and the internet protocol family ("family inet"), such as IPv4 routes, to enable an end-to-end segment routed LSP to tunnel through the established resource reservation LSP. In this way, a segment routed LSP may be established regardless of whether one or more routers along the shortest path of the computed segment routed LSP is not enabled for segment routing.

Figure 4:
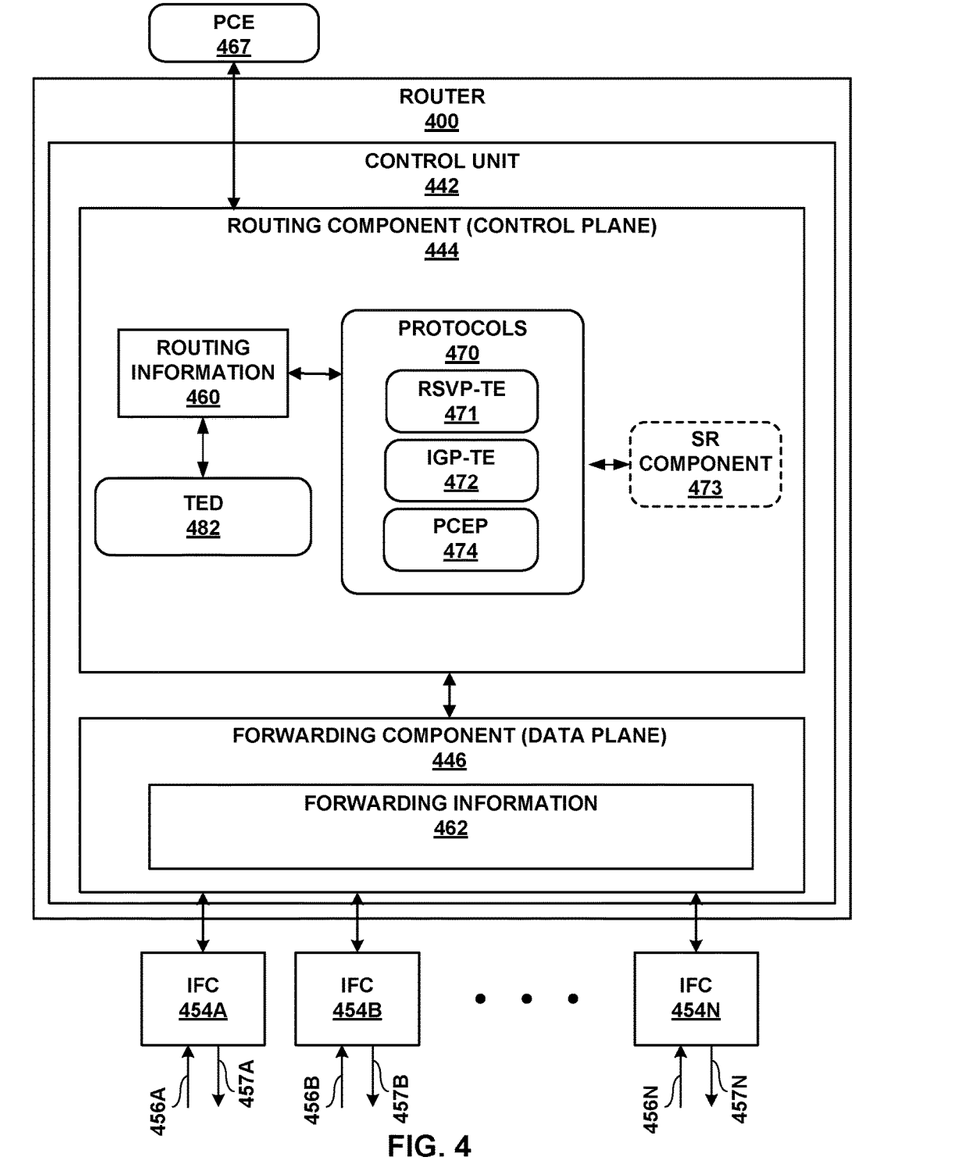
FIG. 4 is a block diagram illustrating an example router capable of operating in accordance with the techniques described herein.

FIG. 4 is a block diagram illustrating an example router 400 that performs various aspects of the techniques described in this disclosure. Router 400 may represent any of routers 12 of FIG. 1. While described with respect to router 400, the techniques may be implemented by any other type of network device capable of implementing at least routing protocols including a resource reservation protocol or segment routing protocol. Thus, while described with respect to router 400, the techniques should not be limited to router 400 described with respect to the example of FIG. 4.

In the example of FIG. 4, router 400 includes interface cards 454A-454N ("IFCs 454") that receive and send data units, such as packet flows, via network links 456A-456N and 457A-457N, respectively. Router 400 may include a chassis (not shown) having a number of slots for receiving a set of cards, including IFCs 454. Each card may be inserted into a corresponding slot of the chassis for electrically coupling the card to routing component 444 via high-speed switch (not shown), which may comprise, for example, switch fabric, switchgear, a configurable network switch or hub, or other high-speed switching mechanisms. IFCs 454 may be coupled to network links 456A-456N and 457A-457N via a number of physical interface ports (not shown). Generally, IFCs 454 may each represent one or more network interfaces by which router 400 may interface with links of a network.

In general, router 400 may include a control unit 442 that determines routes of received packets and forwards the packets accordingly via IFCs 454. In the example of FIG. 4, control unit 442 includes routing component 444 (control plane) that configures and controls packet forwarding operations applied by packet forwarding component 446 (data plane).

Routing component 444 provides an operating environment for various routing protocols 450 that execute at different layers of a network stack. Routing component 444 is responsible for the maintenance of routing information 460 to reflect the current topology of a network and other network entities to which router 400 is connected. In particular, routing protocols periodically update routing information 460 to accurately reflect the topology of the network and other entities based on routing protocol messages received by router 400. The protocols may be software processes executing on one or more processors. For example, routing component 444 includes network protocols that operate at a network layer of the network stack, which are typically implemented as executable software instructions.

In the example of FIG. 4, protocols 470 may include Resource Reservation Protocol with Traffic Extensions (RSVP-TE) protocol 471 to establish RSVP-TE LSPs (e.g., RSVP LSP 26 of FIG. 1). For example, routing component 444 may use RSVP-TE 471 to generate and send Path and Resv messages for establishing RSVP LSPs.

Protocols 470 may also include IGP-TE 472 to implement an IGP protocol with traffic engineering extensions to exchange link state information, and facilitate forwarding of packets or other data units between endpoint devices. In some examples, IGP-TE component 472 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-lsa-extend-01.txt, each of which are incorporated by reference as if set forth in their respective entireties. In some examples, IGP-TE component 472 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990, which is incorporated by reference in its entirety. IGP-TE component may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt, which is incorporated by reference in its entirety.

Protocols 470 may also include configuration protocols. For example, protocols 470 may include PCEP 374 in accordance with RFC 5440, by JP. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011, each of which is incorporated by reference in its entirety. Protocols 470 may include other routing protocols (not shown), such as routing information protocol (RIP), border gateway protocol (BGP), or other network protocols.

In some examples in which router 400 supports a SPRING protocol, routing component 444 includes a segment routing (SR) component 473 to implement segment routing techniques for IGP protocols (e.g., IS-IS and OSPF) for specifying how router 400 may advertise node or adjacency labels. As described in FIG. 1, these node or adjacency labels may steer a packet through a controlled set of instructions, called segments, by prepending the packet with a segment routing header.

By executing the routing protocols, routing component 444 identifies existing routes through the network and determines new routes through the network. Routing component 444 stores routing information 460 that includes, for example, known routes through the network. Forwarding component 446 stores forwarding information 462 that includes destinations of output links 457. Forwarding information 462 may be generated in accordance with routing information 460.

Routing component 444 may include a Traffic Engineering Database (TED) 482 for storing e.g., path information for resource reservation LSPs or segment routed LSPs. In some examples in which router 400 supports segment routing (e.g., SPRING), TED 482 may include segment identifier information. As described below, a controller may peer into, or import from, TED 482 to determine whether router 400 is enabled for segment routing. TED 482 may be in the form of a variety of data structures, such as a number of tables, link lists, radix trees, databases, flat files, or other data structures.

In accordance with the techniques described in this disclosure, a path computation element (PCE) 467, such as a controller (e.g., controller 30 of FIG. 1), may establish a PCEP configuration session with router 400, for example. Router 400 may establish a PCEP configuration session with PCE 467 in which router 400 may receive path configuration information, e.g., provisioning information, from PCE 467 to establish a resource reservation LSP.

As described above in FIG. 3, router 400 may also receive a tunneling command from PCE 467 to enable a segment routed LSP to tunnel through the RSVP LSP that includes router 400. The tunneling command may include configuring routing protocols, e.g., ISIS and Traffic-Engineering, and an Internet Protocol Family, e.g., IPv4.

Router 400 may rely on information in TED 482 (or configuration information from PCE 367) to provide resource reservation protocol reservations. In one example, router 400 may use RSVP-TE 451 to generate Resv messages based on the provisioning information from PCE 467. In this way, router 300, via configuration information from PCE 467, may establish a resource reservation LSP for which a segment routed LSP may tunnel through the resource reservation LSP.

Although described for purposes of example with respect to a router, router 400 may be more generally a network device having routing functionality, and need not necessarily be a dedicated routing device. The architecture of router 400 illustrated in FIG. 4 is shown for example purposes only. The techniques of this disclosure are not limited to this architecture. In other examples, router 400 may be configured in a variety of ways. In one example, some of the functionally of control unit 442 may be distributed within IFCs 454. In another example, control unit 442 may comprise a plurality of packet forwarding engines operated as slave routers.

Control unit 442 may be implemented solely in software, or hardware, or may be implemented as a combination of software, hardware, or firmware. For example, control unit 442 may include one or more processors that execute program code in the form of software instructions. In that case, the various software components/modules of control unit 442 may comprise executable instructions stored on a computer-readable storage medium, such as computer memory or hard disk.

Figure 5:
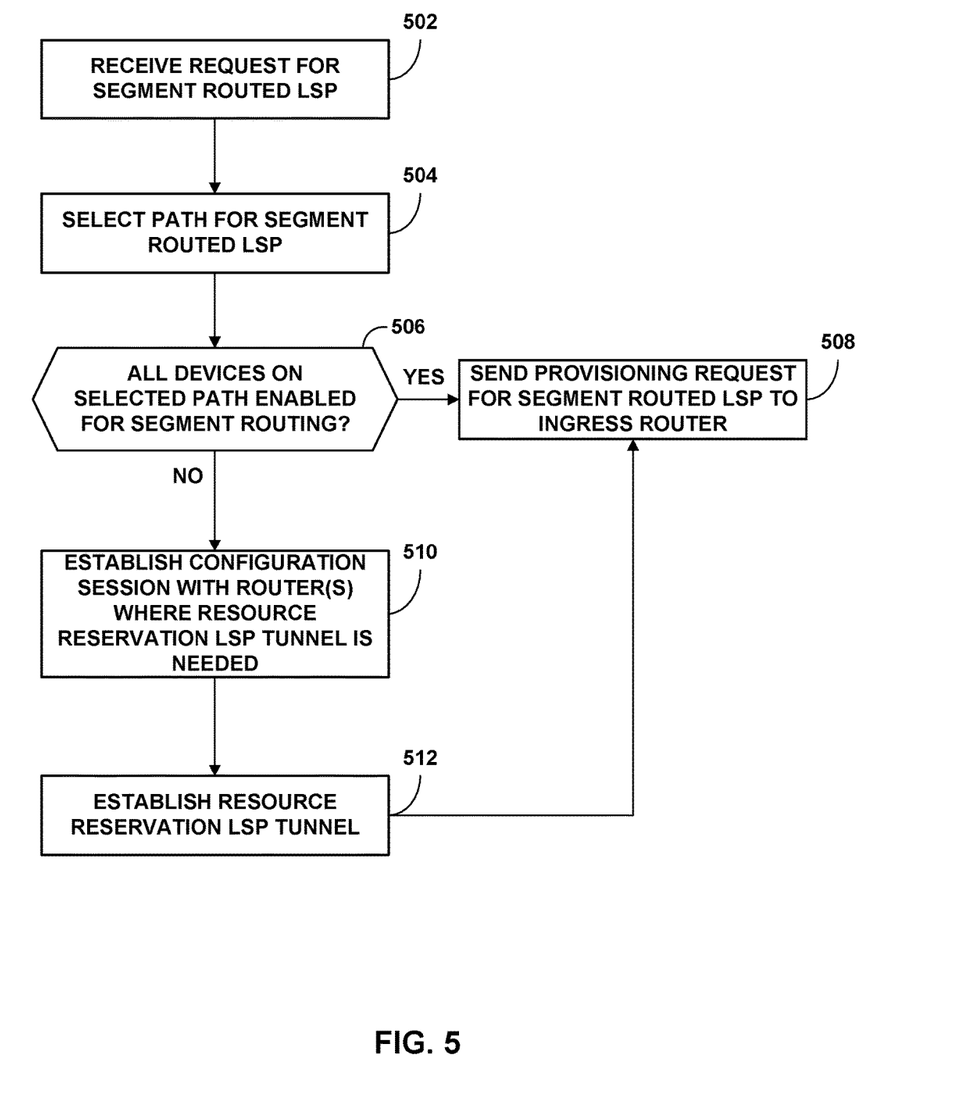
FIG. 5 is a flowchart illustrating an example operation for tunneling a segment routed LSP through a resource reservation LSP, in accordance with the techniques of this disclosure.

FIG. 5 is a flowchart illustrating an example operation of a controller for establishing a segment routed LSP that is tunneled through a resource reservation LSP, in accordance with the techniques described in this disclosure. FIG. 5 will be explained with reference to controller 200 of FIG. 2 and path computation element 212 of FIG. 3.

Controller 200 may receive a request for establishing a segment routed LSP (502). In some examples, controller 200 may receive from a network administrator (or another entity) requesting a service requiring a segment routed LSP from an ingress router, e.g., router 12A to an egress router, e.g., router 12G.

Path computation module 214 may use CSPF to select the shortest path for the segment routed LSP (504). Controller 200 may determine whether all routers in the selected path are enabled for segment routing (506). For example, path computation module 214 may determine from SID information imported into TED 242 (or alternatively from LSDBs of routers 12) whether one or more routers in the shortest path are not enabled for segment routing. In particular, path computation module 214 may determine whether each of routers 12 includes segment identifier information. If each of the routers 12 includes segment identifier information, path computation module 214 may determine that the routers in the shortest path are enabled for segment routing. In response, path provisioning module 218 of controller 200 may send a provisioning request to the ingress router to provision the segment routed LSP (508).

In the absence of segment identifier information in one or more routers in the shortest path, path provisioning module 218 may provision a resource reservation LSP such that the segment routed LSP may tunnel through the resource reservation LSP.

For example, path provisioning module 218 of controller 200 may configure a configuration session with one or more routers in which a resource reservation LSP is to be established (510). In one instance, path provisioning module 218 of controller 200 may use PCEP to establish a PCEP configuration session or NETCONF to establish a NETCONF configuration session with the one or more routers.

Controller 200 may then establish the resource reservation LSP tunnel (512). For example, path provisioning module 218 of controller 200 may send a provisioning request for a resource reservation LSP to one or more routers that are adjacent to the router that is not enabled for segment routing. The adjacent router may send, e.g., resource reservation protocol reservations to establish a resource reservation LSP, e.g., RSVP LSP, tunnel through the router that is not enabled for segment routing.

As described above, to enable tunneling support on the one or more routers in which the resource reservation LSP is to be established, controller 200 may configure a tunneling command including a routing protocol and an internet protocol family. In some examples, controller 200 may enable tunneling support upon initial configuration of the routers.

In response to enabling the resource reservation LSP tunnel, controller 200 may send a provisioning request for segment routed LSP to the ingress router. In this way, rather than rejecting a request to provision a segment routed LSP when one or more routers in the shortest path are not enabled for segment routing, controller 200 may establish a resource reservation LSP including the one or more routers that are not enabled for segment routing such that a segment routed LSP may tunnel through the resource reservation LSP.

Figure 6:
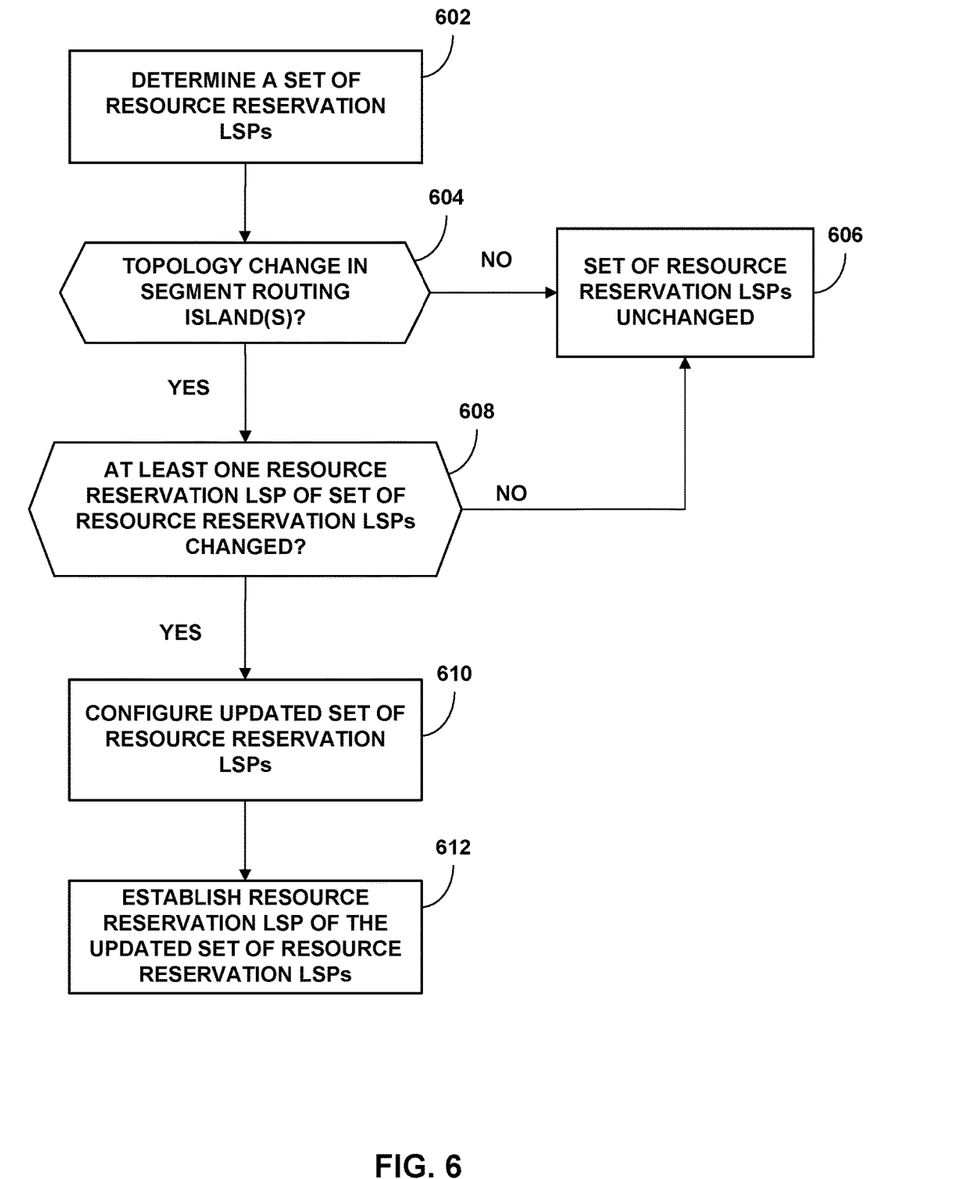
FIG. 6 is a flowchart illustrating an example operation for adjusting a set of available resource reservation LSPs that connect segment routing islands, in accordance with the techniques described in this disclosure.

FIG. 6 is a flowchart illustrating an example operation for adjusting a set of available resource reservation LSPs that connect segment routing islands, in accordance with the techniques described in this disclosure. FIG. 6 will be explained with reference to controller 30 of FIG. 1 and controller 200 of FIG. 2. Segment routing islands are groups of neighboring routers that are enabled for segment routing.

Controller 30 may determine a set of resource reservation LSPs that each provide connectivity to a plurality of segment routing islands, e.g., segment routing islands 32 of FIG. 1 (602). For example, controller 30 may determine that RSVP LSP 26 connects segment routing island 32A to segment routing island 32B, and RSVP LSP 34 connects segment routing island 32A to segment routing island 32B.

Controller 30 may determine a change in topology to any of segment routing islands 32, e.g., based on data stored in TED 242 (604). For example, segment routing island 32B may include routers 12E-12G. In one instance, if controller 30 determines that the topology of segment routing islands 32 is unchanged (i.e., still includes routers 12E-12G), the set of resource reservation LSPs remains unchanged (606). That is, the current set of resource reservation LSPs connecting segment routing islands 32 still includes RSVP LSPs 26, 34.

In another instance, controller 30 may determine based on TED 242 that the topology has changed for segment routing islands 32B. For example, router 12E within segment routing island 32B may no longer enabled for segment routing. In another example, an additional router enabled for segment routing may be added to segment routing island 32B. In any event, controller 30 may determine the topology of segment routing island 32B has changed.

In response to determining that the topology of at least one of segment routing islands 32 has changed, controller 30 may determine whether the set of resource reservation LSPs has changed or needs to be updated based on the change in topology (608). That is, controller 30 may determine whether segment routed LSP, e.g., SPRING LSP 24, can still connect segment routing islands 32 by tunneling through each of RSVP LSPs 26 and 34 of the set of resource reservation LSPs.

In one instance, if controller 30 determines that the current set of resource reservation LSPs still provides connectivity between segment routing islands 32, the set of resource reservation LSPs remains unchanged (606).

In another instance, if controller 30 determines that there is a change in the current set of resource reservation LSPs, controller 30 may configure an updated set of resource reservation LSPs including one or more resource reservation LSPs that provide connectivity to the plurality of segment routing islands after the topology change (610). In the example where router 12E no longer is segment routing enabled, controller 30 may determine that SPRING LSP 24 may no longer tunnel through RSVP LSP 26 to connect segment routing islands 32. In response, controller 30 may remove RSVP LSP 26 from the current set of resource reservation LSPs to form an updated set of resource reservation LSPs.

Controller 30 may provide the updated set of resource reservation LSPs for which a segment routed LSP may connect segment routing islands 32 by tunneling though a resource reservation LSP from the updated set of resource reservation LSPs. For example, controller 30 may establish a new resource reservation LSP, e.g., RSVP LSP 34, from the updated set of resource reservation LSPs such that a segment routed LSP, e.g., SPRING LSP 24, may tunnel through the resource reservation LSP from the updated set of resource reservation LSPs (612). In this way, controller 30 may, in response to a request to provision a segment routed LSP, establish a resource reservation LSP from the updated set of resource reservation LSPs in which the segment routed LSP may tunnel through the resource reservation LSP to connect segment routing islands 32.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

Various aspects of the techniques have been described. These and other aspects are within the scope of the following claims.

What is claimed is:

1. A method comprising:
   receiving, by a controller that manages a plurality of network devices in a network, a request for a segment routed Label Switched Path (LSP) that extends from an ingress network device of the plurality of network devices to an egress network device of the plurality of network devices;
   determining, by the controller, that a first network device of the plurality of network devices along a path selected for the segment routed LSP is not enabled for segment routing;
   in response to determining that the first network device is not enabled for segment routing, establishing, by the controller, a resource reservation LSP from a second network device to a third network device, wherein the first network device is positioned in between the second network device and the third network device; and
   sending, by the controller and to the ingress network device, a provisioning request for the segment routed LSP.

2. The method of claim 1, wherein receiving the request for the segment routed LSP comprises receiving a request for a Source Packet Routing in Networking (SPRING) LSP.

3. The method of claim 1, wherein establishing the resource reservation LSP comprises establishing a Resource Reservation Protocol (RSVP) LSP.

4. The method of claim 1, wherein establishing the resource reservation LSP comprises establishing the resource reservation LSP along a path that includes the first network device.

5. The method of claim 1, wherein determining that the first network device is not enabled for segment routing comprises:
   determining, by the controller, that a Traffic Engineering Database (TED) of the controller does not include a segment identifier (SID) associated with the first network device.

6. The method of claim 1, wherein determining that the first network device is not enabled for segment routing comprises:
   determining, by the controller, that a link state database (LSDB) of the first network device does not include a segment identifier (SID) associated with the first network device.

7. The method of claim 1, wherein establishing the resource reservation LSP from the second network device to the third network device comprises:

establishing, by the controller, a configuration session with the second network device, the configuration session comprising at least a Path Computation Element Protocol (PCEP) configuration session and a Network Configuration Protocol (NETCONF) configuration session.

8. The method of claim 1, further comprising:
configuring, by the controller, a tunneling command to enable tunneling support from the second network device to the third network device, wherein the tunneling support enables the segment routed LSP to tunnel through the resource reservation LSP established through the first network device.

9. The method of claim 1, further comprising:
in response to determining that the first network device is not enabled for segment routing, proceeding, by the controller, with the request for the segment routed LSP.

10. The method of claim 1, further comprising:
selecting, by the controller, the path for the segment routed LSP based on a traffic engineering database of the controller.

11. A controller that manages a plurality of network devices in a network comprising:
a memory; and
one or more processors operably coupled to the memory, wherein the one or more processors are configured to:
receive a request for a segment routed Label Switched Path (LSP) that extends from an ingress network device of the plurality of network devices to an egress network device of the plurality of network devices;
determine that a first network device of the plurality of network devices along a path selected for the segment routed LSP is not enabled for segment routing;
in response to determining that the first network device is not enabled for segment routing, establish a resource reservation LSP from a second network device to a third network device, wherein the first network device is positioned in between the second network device and the third network device; and
send a provisioning request for the segment routed LSP.

12. The controller of claim 11, wherein the segment routed LSP comprises a Source Packet Routing in Networking (SPRING) LSP.

13. The controller of claim 11, wherein the resource reservation LSP comprises a Resource Reservation Protocol (RSVP) LSP.

14. The controller of claim 11, wherein the resource reservation LSP is established along a path that includes the first network device.

15. The controller of claim 11, wherein, to determine that the first network device of the plurality of network devices is not enabled for segment routing, the one or more processors and memory are configured to:
determine that a Traffic Engineering Database (TED) of the controller does not include a segment identifier (SID) associated with the first network device.

16. The controller of claim 11, wherein, to determine that the first network device of the plurality of network devices is not enabled for segment routing, the one or more processors and memory are configured to:
determine that a link state database (LSDB) of the first network device does not include a segment identifier (SID) associated with the first network device.

17. The controller of claim 11, wherein, to establish the resource reservation LSP from the second network device to the third network device, the one or more processors further configured to:
establish a configuration session with the second network device, wherein the configuration session comprises at least one of a Path Computation Element Protocol (PCEP) configuration session and a Network Configuration Protocol (NETCONF) configuration session.

18. The controller of claim 11, wherein the one or more processors are further configured to:
configure a tunneling command to enable tunneling support from the second network device to the third network device, wherein the tunneling support enables the segment routed LSP to tunnel through the resource reservation LSP established through the first network device.

19. The controller of claim 11, wherein the one or more processors are further configured to:
in response to determining that the first network device is not enabled for segment routing, proceed with the request for the segment routed LSP.

* * * * *